(12) United States Patent
Huynh

(10) Patent No.: US 12,134,825 B1
(45) Date of Patent: Nov. 5, 2024

(54) ELECTROLYZER, SYSTEM AND METHOD FOR PRODUCING HYDROGEN GAS

(71) Applicant: Hoa Van Huynh, Ho Chi Minh (VN)

(72) Inventor: Hoa Van Huynh, Ho Chi Minh (VN)

(73) Assignee: Hoa Van Huynh, Ho Chi Minh (VN)

( * ) Notice: Subject to any disclaimer, the term of this patent is extended or adjusted under 35 U.S.C. 154(b) by 0 days.

(21) Appl. No.: 18/520,571

(22) Filed: Nov. 28, 2023

(51) Int. Cl.
| | | |
|---|---|---|
| C25B 1/04 | (2021.01) | |
| C25B 9/17 | (2021.01) | |
| C25B 9/63 | (2021.01) | |
| C25B 9/67 | (2021.01) | |
| C25B 11/061 | (2021.01) | |
| C25B 11/089 | (2021.01) | |
| C25B 15/027 | (2021.01) | |
| C25B 15/031 | (2021.01) | |
| C25B 15/08 | (2006.01) | |

(52) U.S. Cl.
CPC ............ *C25B 1/04* (2013.01); *C25B 9/17* (2021.01); *C25B 9/63* (2021.01); *C25B 9/67* (2021.01); *C25B 11/061* (2021.01); *C25B 11/089* (2021.01); *C25B 15/027* (2021.01); *C25B 15/031* (2021.01); *C25B 15/08* (2013.01); *C25B 15/085* (2021.01)

(58) Field of Classification Search
None
See application file for complete search history.

(56) References Cited

U.S. PATENT DOCUMENTS

| | | | | |
|---|---|---|---|---|
| 3,884,792 | A * | 5/1975 | McGilvery | C25B 9/17 204/256 |
| 5,783,051 | A * | 7/1998 | Hirai | C25B 9/05 204/255 |
| 2003/0057088 | A1* | 3/2003 | Ichikawa | C25B 9/23 204/252 |
| 2003/0141200 | A1* | 7/2003 | Harada | C25B 1/04 205/637 |
| 2003/0148171 | A1* | 8/2003 | Mitlitsky | C25B 15/00 429/61 |
| 2007/0007145 | A1* | 1/2007 | Simmons | C25B 9/75 205/357 |
| 2021/0222307 | A1* | 7/2021 | Evans | C25B 9/67 |

FOREIGN PATENT DOCUMENTS

| | | | | |
|---|---|---|---|---|
| DE | 102020005285 A1 * | 3/2022 | | |
| WO | WO-2022268378 A1 * | 12/2022 | ............ | C25B 1/04 |
| WO | WO-2024132350 A1 * | 6/2024 | ............ | C25B 1/04 |

* cited by examiner

*Primary Examiner* — Louis J Rufo

(57) ABSTRACT

The present invention is to provide a system for producing hydrogen gas, comprising: an electrolyte solution supply system, an electrolyzer, a hydrogen gas purification system, and a hydrogen gas compression and drying system. Wherein the electrolyte solution supply system operable to supply the electrolyte solution; the electrolyzer operable to perform the electrolysis creates hydrogen gas and oxygen gas; the hydrogen gas purification system operable to the purification of hydrogen gas; and the hydrogen gas compression and drying system operable to dry and compress hydrogen gas to a pressure of a predetermined value. In addition, the invention also mentions a method for producing hydrogen gas to produce hydrogen gas with a purity of more than 99.8%.

1 Claim, 4 Drawing Sheets

ELECTROLYZER, SYSTEM AND METHOD FOR PRODUCING HYDROGEN GAS

FIELD OF THE INVENTION

The present invention relates to the field of electrochemistry. More specifically, the present invention relates to an electrolyzer, system and method for producing hydrogen gas for the production of high purity hydrogen gas.

BACKGROUND ART

In the context that the world is constantly trying to reduce $CO_2$ emissions, green and renewable energy sources are considered an effective alternative. One of the brightest candidates for this solution is hydrogen energy—this is a clean energy source with great potential in the future.

Today, hydrogen fuel can be produced through a number of methods. The most common methods are natural gas conversion (the thermal process) and the electrolysis. Other methods include biological processes and the use of solar energy. Thermal processes for hydrogen production typically involve steam reformation, a high-temperature process in which steam reacts with hydrocarbon fuels to produce hydrogen. Many hydrocarbon fuels can be modified to produce hydrogen gas, including natural gas, diesel, renewable liquid fuels, gasified coal or gasified biomass. Today, about 95% of total hydrogen gas is produced from the water vapor conversion of natural gas.

The water can be separated into oxygen gas and hydrogen gas through a process known as electrolysis. The electrolytic processes take place in an electrolyzer, which acts like a fuel cell in reverse—instead of using the energy of a hydrogen molecule, like a fuel cell, the electrolyzer generates hydrogen from water molecules. Currently, in the world, there are many electrolytic devices for hydrogen gas production, but there are still many major shortcomings such as high production costs, low-life electrodes prone to corrosion, and the amount of hydrogen gas collected low purity, etc. . . .

Patent application VN 1-2020-01721, discloses a water electrolysis system for the production of hydrogen gas and oxygen gas, comprising: an electrolyzer, electrolyte solution dispensing tank, electrolyte solution heater, hydrogen tank, oxygen tank and an electricity supply source. Wherein, the electrolyzer has positive electrode plates, negative electrode plates, a plurality of the third electrode plates, and a plurality of the insulation plates. The positive electrode plate made of thin stainless steel and coated with molydenum layer; the negative electrode plate made of thin stainless steel and coated with nickel layer; the third electrode plate made of thin stainless steel; the insulation plate made of carbon or silicone. Furthermore, the present invention provides the electrolyte solution which is prepared by dissolving a mixture of a strong base and a strong acid in water in a ratio of 5-22% (w/w).

In patent number U.S. Ser. No. 11/008,663B2, discloses an electrolysis system comprising: a water electrolysis unit having a water electrolysis cell using a solid polymer electrolyte membrane as a diaphragm, a DC power source for supplying the water electrolysis cell with a DC current, and a mitigation unit for mitigating, when a counter electromotive force or abrupt potential fluctuation occurs in the water electrolysis cell, the counter electromotive force or the potential fluctuation, wherein the DC power source, the mitigation unit, and the water electrolysis unit are connected in series in this order.

In patent number U.S. Ser. No. 11/162,181B2, discloses a hydrogen production apparatus, comprising: a rectifier supplied with first electrical power from outside, and that outputs direct-current second electrical power; an electrolyzer supplied with the second electrical power and that carries out electrolysis of an alkaline aqueous solution; an electrolyzer tank that retains the alkaline aqueous solution; a pump that circulates the alkaline aqueous solution between the electrolyzer and the electrolyzer tank; a pure water tank that retains a pure water; and a pure water pipe connected between the pure water tank and the electrolyzer tank, allowing the pure water to be distributed from the pure water tank to the electrolyzer tank, wherein an inert gas is introduced into the pure water pipe and at least a part of the pure water within the pure water pipe is discharged from the pure water pipe, when supply of the first electrical power has stopped.

Therefore, it is necessary to have the electrolyzer with electrodes made of corrosion-resistant materials with high electrolytic efficiency.

It is also necessary to have the system and method for producing hydrogen gas capable of producing high purity hydrogen gas at low cost.

The system disclosed in the present invention solves the above described problems.

SUMMARY OF THE INVENTION

The main purpose of the invention is to provide an electrolyzer, comprising: a case, an electrolyte solution inlet, an electrolyte solution outlet, a hydrogen gas outlet, an oxygen gas outlet, a water injection equipment, a hydrogen gas injection equipment, an electrolyte chamber, and an electrolyte cell; wherein: the electrolyte cell is arranged inside the electrolyte chamber, operable to operable to perform the electrolysis creates hydrogen gas and oxygen gas; the electrolyte chamber contains the electrolyte solution; wherein the electrolyte chamber is divided into an anode chamber and a cathode chamber by compartment plates; the water injection equipment is installed on the side of the cathode chamber, operable to inject a water in granular have high-pressure into the cathode chamber; the hydrogen gas injection equipment is installed on the side of the anode chamber, operable to inject a hydrogen gas in granular have high-pressure into the anode chamber.

The other purpose of the invention is to provide a system for producing hydrogen gas, comprising: an electrolyte solution supply system, an electrolyzer, a hydrogen gas purification system, and a hydrogen gas compression and drying system; wherein: the electrolyte solution supply system operable to supply the electrolyte solution; the electrolyzer connected to the electrolyte solution supply system, comprising a water injection equipment, a hydrogen gas injection equipment, an electrolyte chamber, and an electrolyte cell; wherein: the electrolyte cell is arranged inside the electrolyte chamber, operable to perform the electrolysis creates hydrogen gas and oxygen gas; the electrolyte chamber contains the electrolyte solution; wherein the electrolyte chamber is divided into an anode chamber and a cathode chamber by compartment plates; the water injection equipment is installed on the side of the cathode chamber, operable to inject a water in granular have high-pressure into the cathode chamber; the hydrogen gas injection equipment is installed on the side of the anode chamber, operable to inject a hydrogen gas in granular have high-pressure into the anode chamber; the hydrogen gas purification system connected to the electrolyzer, operable to the purification of hydrogen gas, obtain high purity hydrogen gas; and the hydrogen gas compression and drying system connected to the hydrogen gas purification system, operable to dry and compress hydrogen gas to a pressure of a predetermined value.

The other purpose of the invention is to provide a method for producing hydrogen gas comprising the following steps: (i) creating an electrolyte solution by dissolving alkaline hydroxide in water; wherein the electrolyte solution has a pH of 9-10; (ii) raising the pH of the electrolyte solution obtained in step i) by leading said electrolytic solution in turn through plurality of electrolyte solution production equipment of an electrolyte solution production equipment assembly, obtaining electrolyte solution has a pH of 14; (iii) heating the electrolyte solution to a temperature of 55° C.-65° C.; (iv) moving the electrolyte solution obtained in step iii) into an electrolyte chamber of an electrolyzer; wherein an electrolyte cell performing the electrolysis creates hydrogen gas and oxygen gas, the hydrogen gas produced concentrate mostly in a cathode chamber, and the oxygen gas produced concentrate mostly in an anode chamber; wherein a water injection equipment operates to inject a water in granular have high-pressure into the cathode chamber, and a hydrogen gas injection equipment operates to inject a hydrogen gas in granular have high-pressure into the anode chamber; (v) purifying the hydrogen gas obtained from the electrolyzer by a hydrogen gas purification system; and (vi) drying and compressing the hydrogen gas by a hydrogen gas compression and drying system.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

References will now be made in detail to the invention, examples of which are illustrated in the accompanying drawings. The invention is intended to cover alternatives, modifications and equivalents, which may be included within the spirit and scope of the invention as defined by the appended claims. In the following detailed description of the present invention, numerous specific details are set forth in order to provide a thorough understanding of the present invention. However, it would be obvious to one of ordinary skills in the art at the time of the invention was made, it may be practiced without these specific details. In other instances, well-known methods, procedures, components, and circuits have not been described in detail so as not to unnecessarily obscure aspects of the present invention.

Figure 1:
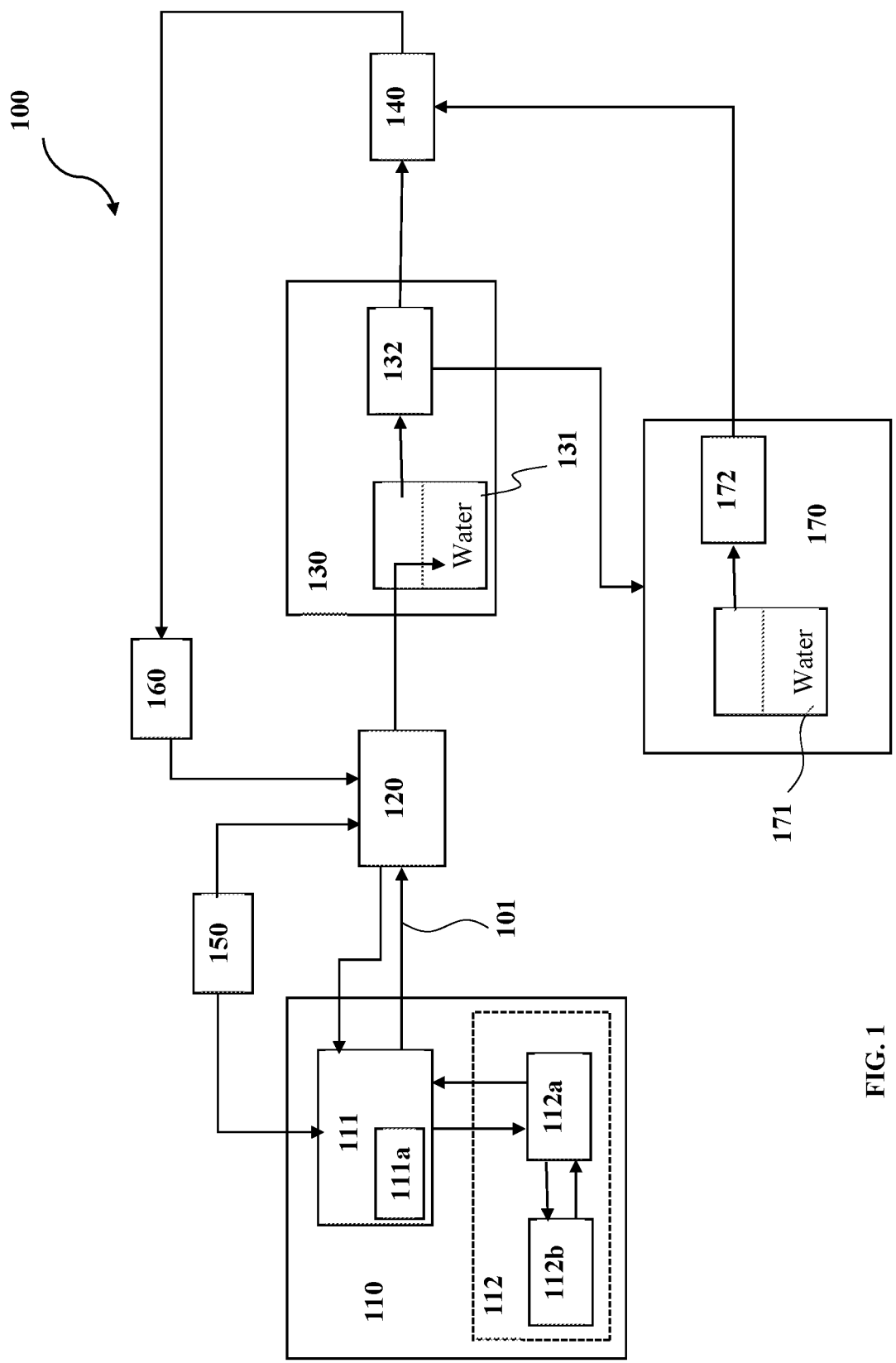
FIG. 1 illustrating the system for producing hydrogen gas in accordance with an exemplary embodiment of the present invention.

With reference to FIG. 1, a system for producing hydrogen gas 100 ("system 100"), comprising an electrolyte solution supply system 110, an electrolyzer 120, a hydrogen gas purification system 130, a hydrogen gas compression and drying system 140, a water supply equipment 150, a hydrogen gas supply equipment 160, and an oxygen gas purification system 170, all are mechanically connected together by pipes 101. According to different embodiments of the present invention, the pipes 101 are of different shapes and sizes to facilitate fluid flow between units. According to an embodiment of the invention, the system 100 further comprising a controller (not shown) used to control components in the system 100.

The electrolyte solution supply system 110 to supply electrolyte solution to the electrolyzer 120 for hydrogen gas production. The clean water from the water supply equipment 150 is fed into the electrolyte solution supply system 110, where the clean water is converted into an electrolyte solution with a pH of 14. According to different embodiments of the present invention, the electrolyte solution supply system 110 comprising an electrolyte solution tank 111, and an electrolyte solution production equipment assembly 112. Inside the electrolyte solution tank 111 is also installed a heater 111a to help heat the electrolyte solution to the appropriate temperature. The electrolyte solution production equipment assembly 112 comprising a plurality of electrolyte solution production equipment connected together. According to different embodiments of the present invention, the electrolyte solution production equipment assembly 112 comprising a first electrolyte solution production equipment 112a connected to a second electrolyte solution production equipment 112b.

Figure 2A:
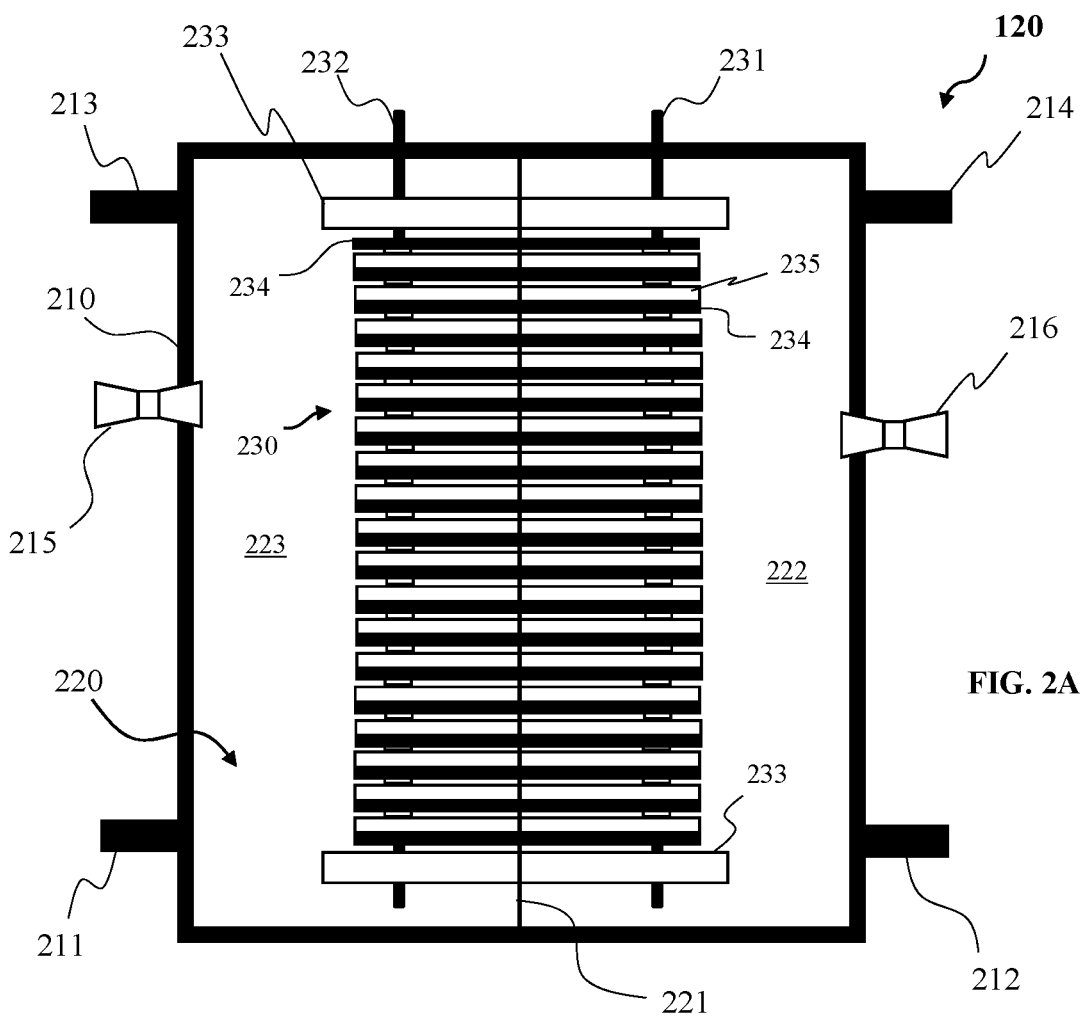
FIG. 2A illustrating structure of the electrolyzer in accordance with an exemplary embodiment of the present invention.
Figure 2B:
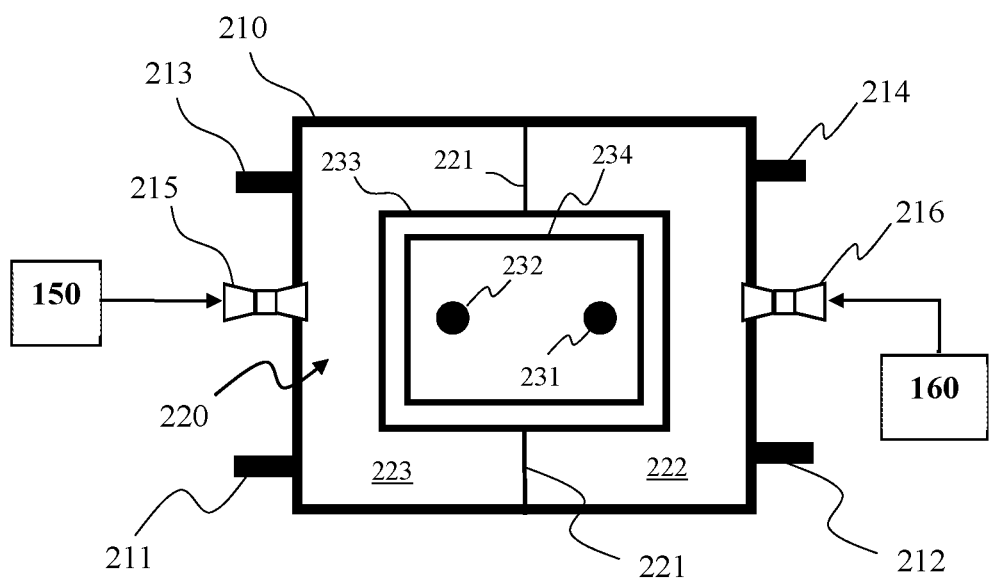
FIG. 2B illustrating structure of the electrolyzer in accordance with an exemplary embodiment of the present invention.

Referring to FIG. 2A-FIG. 2B, the electrolyzer 120 comprising: a case 210, an electrolyte solution inlet 211, an electrolyte solution outlet 212, a hydrogen gas outlet 213, an oxygen gas outlet 214, a water injection equipment 215, a hydrogen gas injection equipment 216, an electrolyte chamber 220, and an electrolyte cell 230.

The electrolyte solution from the electrolyte solution supply system 110 is fed into the electrolyte chamber 220 by the electrolyte solution inlet 211. The electrolyte chamber 220 is divided into an anode chamber 222 and a cathode chamber 223 by compartment plates 221.

The water injection equipment 215 is installed on the side of the cathode chamber 223, operable to inject a water in granular have high-pressure into the cathode chamber 223; wherein the water injection equipment 215 is connected to the water supply equipment 150.

The hydrogen gas injection equipment 216 is installed on the side of the anode chamber 222, operable to inject a hydrogen gas in granular have high-pressure into the anode chamber 222; wherein the hydrogen gas injection equipment 216 is connected to the hydrogen gas supply equipment 160.

The electrolyte cell 230 is arranged inside the electrolyte chamber 220, operable to operable to perform the electrolysis creates hydrogen gas and oxygen gas. The hydrogen gas exits the electrolyzer 120 by the hydrogen gas outlet 213, and the hydrogen gas exits the electrolyzer 120 by the oxygen gas outlet 214. After completing perform the electrolysis, the electrolyte solution will be taken out of the electrolyzer 120 by the electrolyte solution outlet 212.

According to different embodiments of the present invention, the electrolyte cell 230 comprising an anode bar 231, a cathode bar 232, support plates 233, metal plates 234, and insulation plates 235. Wherein the anode bar 231 and the cathode bar 232 through the support plates 233, the metal plates 234, and the insulation plates 235. The anode bar 231 is located on the anode chamber 222; the cathode bar 232 is located on the cathode chamber 223. The metal plates 234 and the insulation plates 235 are located between the support plates 233 and are arranged alternately; wherein each metal plate 234 and each insulation plate 235 are pressed together to form a pair of "metal plate 234-insulation plate 235". Each pair of "metal plate 234-insulation plate 235" will be 1 mm-2 mm away from the adjacent pair of "metal plate 234-insulation plate 235", creating space for the electrolytic solution to move.

According to different embodiments of the present invention, each anode bar 231 made of stainless steel base material and coated with cobalt-nickel alloy layer. Each cathode bar 232 is made of stainless steel base material and coated with fullerene layer. Each support plate 233 is made of acrylic resin or polyamide (Pa), and a thickness of 50 mm. Each metal plate 234 is made of stainless steel base material and coated with nickel layer, and a thickness of 1 mm; the number of metal plates 234 is 160 plates. Each insulation plate 235 is made of carbon, and a thickness of 2 mm.

Returning to FIG. 1, the hydrogen gas purification system 130 comprising a hydrogen gas filter equipment 131, and a first molecular filter membrane equipment 132. Wherein the hydrogen gas filter equipment 131 is connected to the hydrogen gas outlet 213 of the electrolyzer 120. When entering the hydrogen gas filter equipment 131, the hydrogen gas stream will enter the water environment to be cleaned, then this hydrogen gas stream is directed to the first molecular filter membrane equipment 132. This hydrogen gas stream still contains a small amount of oxygen gas, so it will be sent to the first molecular filter membrane equipment 132 to continue removing the remaining oxygen gas to obtain high purity hydrogen gas.

Figure 3A:
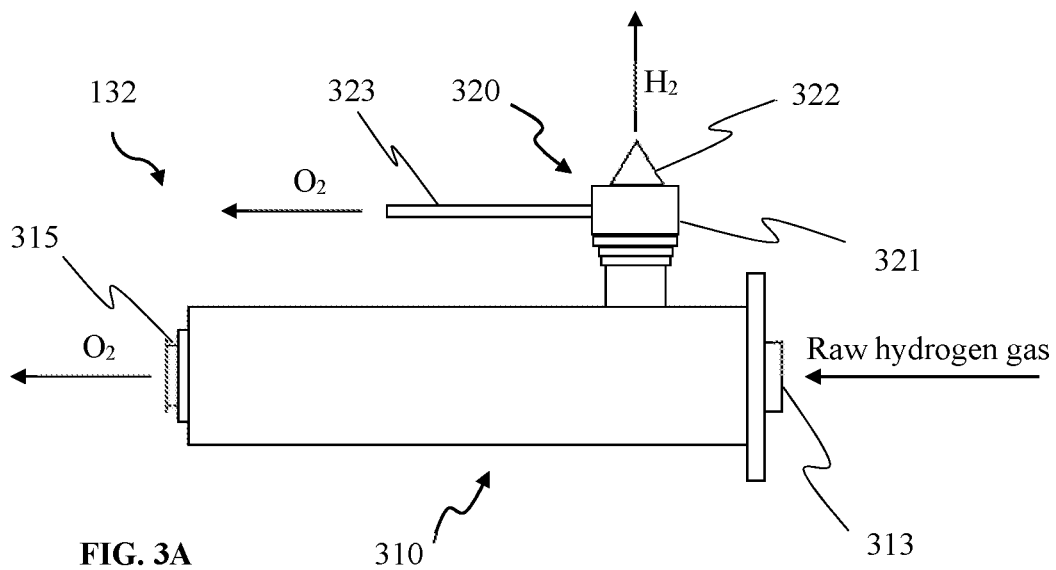
FIG. 3A illustrating structure of the first molecular filter membrane equipment electrolyzer in accordance with an exemplary embodiment of the present invention.
Figure 3B:
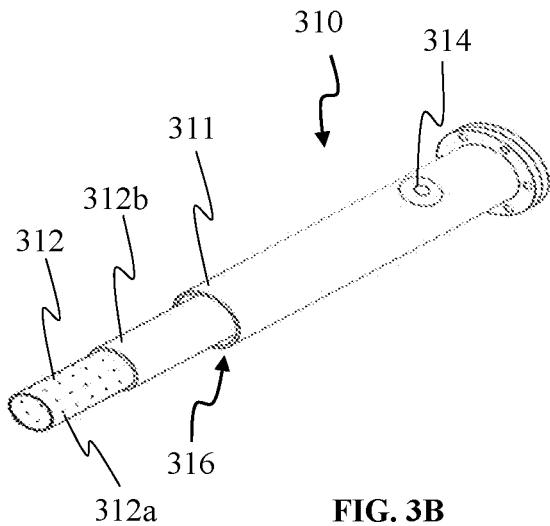
FIG. 3B illustrating structure of the first gas filter assembly of the first molecular filter membrane equipment electrolyzer in accordance with an exemplary embodiment of the present invention.
Figure 3C:
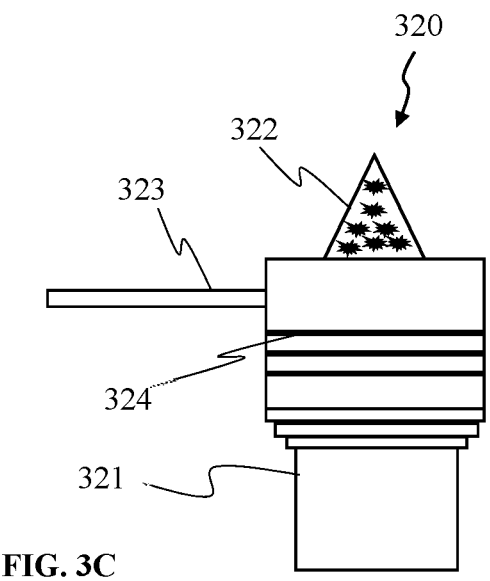
FIG. 3C illustrating structure of the second gas filter assembly of the first molecular filter membrane equipment electrolyzer in accordance with an exemplary embodiment of the present invention.

A Referring to FIG. 3A-FIG. 3C, the first molecular filter membrane equipment 132 comprising a first gas filter assembly 310, and a second gas filter assembly 320. Wherein the first gas filter assembly 310 comprising an outer tube 311, an inner tube 312, a raw gas input 313, a first hydrogen gas output 314, and a first oxygen gas output 315; wherein in the between of the outer tube 311 and the inner tube 312 is a hydrogen chamber 316. The raw gas input 313 through with inside of the inner tube 312. The inner tube 312 has hydrogen outlet holes 312a and has a molecular filter membrane layer 312b wrapped around it. The second gas filter assembly 320 comprising an air filter 321, a second hydrogen gas output 322, and a second oxygen gas output 323. Inside of the air filter 321 is arranged filter pads 324; wherein each filter pad 324 has very small air holes for the passage of hydrogen molecules, and is made of carbon. The second hydrogen gas output 322 is cone shaped, containing a carbon fiber layer inside.

The raw hydrogen gas is directed to the inside of the inner tube 312 by means of the air pump (not shown) and moves in the direction from the raw gas input 313 to the first oxygen gas output 315. During the flow of the raw hydrogen gas moves inside of the inner tube 312, the raw hydrogen gas will tend to exit the hydrogen chamber 316 by means of the hydrogen outlet holes 312a, the membrane holes of the molecular filter membrane layer 312b only allow the hydrogen molecules to pass through, the oxygen molecules are trapped and continue to move towards the first oxygen gas output 315. Therefore, the gas stream coming out from the first oxygen gas output 315 is oxygen, this oxygen stream will be taken to the oxygen gas purification system 170 for processing, obtaining the pure oxygen. The hydrogen chamber 316 contains mostly hydrogen gas, this hydrogen gas also contains a small amount of oxygen gas, so it will be directed into the second gas filter assembly 320 to continue the filtration process. Here, the air flow will pass through the filter pads 324 and carbon fiber layer. The separated oxygen gas exits through the second oxygen gas output 323, and the hydrogen gas exits through the second hydrogen gas output 322.

According to different embodiments of the present invention, the molecular filter membrane layer 312b is made of PVDF resin (Polyvinylidene fluoride).

Returning to FIG. 1, the hydrogen gas coming out from the molecular filter membrane equipment 132 is sent to the hydrogen gas compression and drying system 140 to be dried and compressed to a suitable pressure for storage and use. According to different embodiments of the present invention, the hydrogen gas is also sent to the hydrogen gas supply equipment 160.

The oxygen gas purification system 170 comprising an oxygen gas filter equipment 171, and a second molecular filter membrane equipment 172. Wherein the oxygen gas filter equipment 171 is connected to the oxygen gas outlet 214. When entering the oxygen gas filter equipment 171, the oxygen gas stream will enter the water environment to be cleaned, then this oxygen gas stream is directed to the second molecular filter membrane equipment 172. This oxygen gas stream still contains a small amount of hydrogen gas, so it will be sent to the second molecular filter membrane equipment 172 to continue removing the remaining hydrogen gas to obtain high purity oxygen gas. The amount of hydrogen gas coming out of the second molecular filter membrane equipment 172 is sent to the hydrogen gas compression and drying system 140 to be dried and compressed to a suitable pressure for storage and use. According to different embodiments of the present invention, the second molecular filter membrane equipment 172 and the first molecular filter membrane equipment 132 have the same structure.

According to different embodiments of the present invention, the system 100 further comprising valves and pumps (not shown) mounted on the pipes 101.

Figure 4:
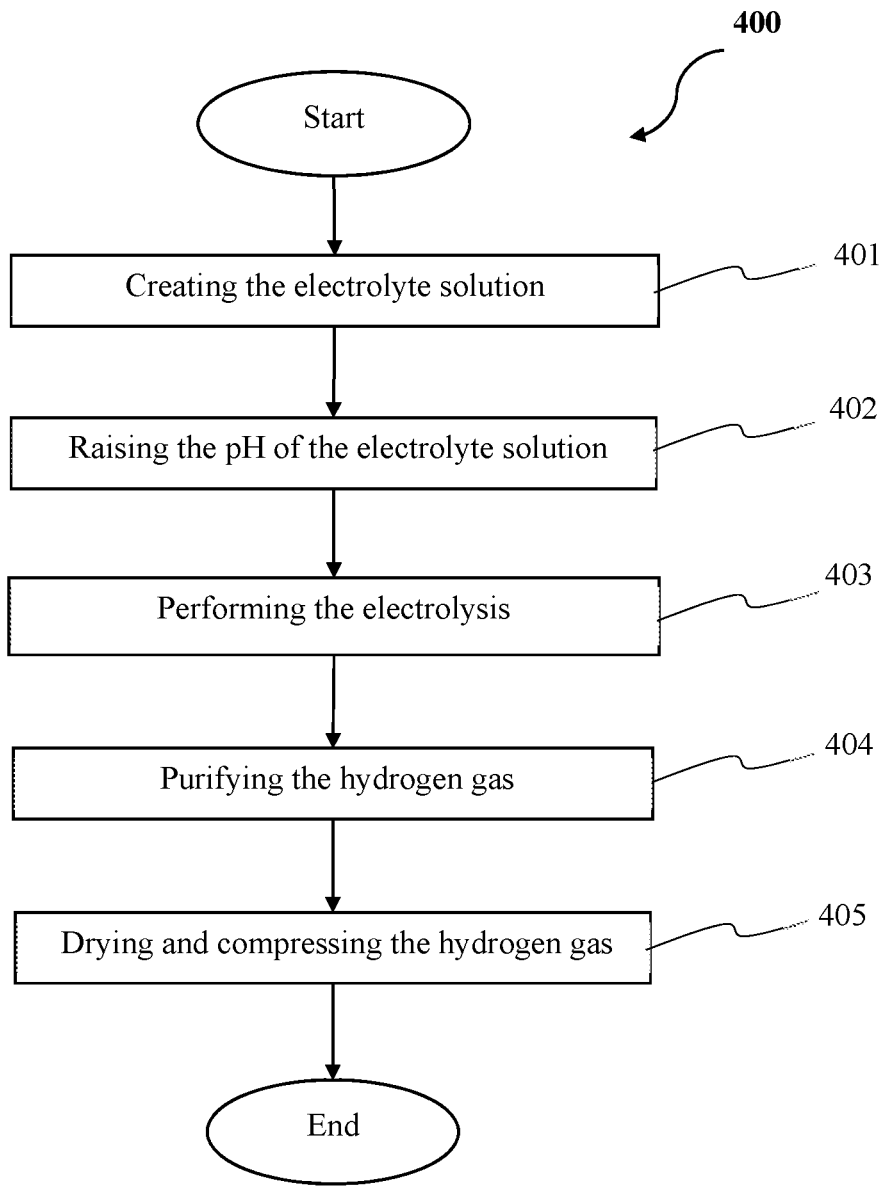
FIG. 4 illustrating the method for producing hydrogen gas in accordance with an exemplary embodiment of the present invention.

Referring to FIG. 4, a method for producing hydrogen gas 400 ("method 400") comprising the following steps:

In step 401, creating an electrolyte solution. Specifically, the water supply equipment 150 injects a quantity of clean water into the electrolyte solution tank 111, then dissolves alkaline hydroxide in the water to form the first electrolyte solution, wherein the alkaline hydroxide comprises KOH, and NaOH, an amount of alkaline hydroxide accounts for 2% of the first electrolyte solution. At this time, the first electrolyte solution has a pH of 9-10.

A In step 402, moving the first electrolyte solution to the electrolyte solution production equipment assembly 112. Here, the first electrolyte solution in turn through the electrolyte solution production equipment of the electrolyte solution production equipment assembly 112 to obtain an electrolytic solution with a pH of 14, then recirculate said electrolyte solution to the electrolyte solution tank 111. Next, heating the electrolyte solution to a temperature of 55° C.-65° C.

In step 403, the pump (not shown) pumps the heated electrolyte solution into the electrolyte chamber 220 of the electrolyzer 120. At that time, the pressure of the electrolyte solution is from 2-4 Bar ($2\times10^5$-$4\times10^5$ Pa). At this time, the electrolyte cell 230 performs the electrolysis to creates hydrogen gas and oxygen gas. The hydrogen gas produced concentrate mostly in the cathode chamber 223, and the oxygen gas produced concentrate mostly in the anode chamber 222. Next, the water injection equipment 215 operates to inject a water in granular have high-pressure into the cathode chamber 223, and the hydrogen gas injection equipment 216 operates to inject a hydrogen gas in granular have high-pressure into the anode chamber 222. The water and the hydrogen gas injected into the cathode chamber 223 and the anode chamber 222 will disturb the electric field to separate the negative ion and positive ion particle waves, helping to move $OH^-$ and $H^+$ ions to correct location and not mixed together. From there, the hydrogen gas and the oxygen gas exit the electrolyzer 120 have high purity.

After the end of performs the electrolysis, the remaining electrolyte solution is removed from the electrolyzer 120 by the electrolyte solution outlet 212. The hydrogen gas is removed from the electrolyzer 120 by the hydrogen gas outlet 213. The oxygen gas is removed from the electrolyzer 120 by the oxygen gas outlet 214.

According to different embodiments of the present invention, the water injection equipment 215 operates to inject the water in granular of 1 nm size, and inject at a pressure of 1.5 Bar ($1.5\times10^5$ Pa). The hydrogen gas injection equipment 216 operates to inject the hydrogen gas in granular of 1 nm size, and inject at a pressure of 1.5 Bar ($1.5\times10^5$ Pa).

In step 404, moving the hydrogen gas from the electrolyzer 120 to the hydrogen gas purification system 130 to purify the hydrogen gas, obtaining hydrogen gas with a purity of more than 99.8%.

Finally at step 405, drying and compressing the hydrogen gas by the hydrogen gas compression and drying system 140. The hydrogen gas obtained from the hydrogen gas compression and drying system 140 is stored for use. In addition, the hydrogen gas is also used to supply the hydrogen gas supply equipment 160. Then, the hydrogen gas supply equipment 160 will supply hydrogen gas to the hydrogen gas injection equipment 216.

According to different embodiments of the present invention, the oxygen gas coming out of the electrolyzer 120 is sent to the oxygen gas purification system 170 for purification, obtaining pure oxygen gas.

According to different embodiments of the present invention, after the end of performs the electrolysis, the remaining amount of the electrolyte solution inside the electrolyte chamber 220 will be circulated to the electrolyte solution tank 111 for continued use in performs the electrolysis.

Implementations of the system for producing hydrogen gas 100 disclosed above achieve the following objectives:

The system for producing hydrogen gas for the production of hydrogen of high purity, which is easy to manufacture, low cost, without diaphragm, and with low energy consumption. Wherein, the electrolyzer of the present invention has electrodes made of corrosion-resistant materials with high electrolytic efficiency.

The system 100 is capable of processing 256L of electrolyte solution in one hour to produce 30 kg of $H_2$ and 30 kg of $O_2$ using only about 24 kW of electricity. The resulting hydrogen gas has a purity of more than 99.8%.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two consecutive blocks shown may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent those of ordinary skill in the art without departing from the scope and spirit of the invention.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

These claims should be construed to maintain the proper protection for the invention first described. It will be understood that those skilled in the art, both now and in the future, may make various improvements and enhancements which fall within the scope of the claims which follow. These claims should be construed to maintain the proper protection for the invention first described.

DESCRIPTION OF NUMERALS

100 System for producing hydrogen gas
101 Pipe
110 Electrolyte solution supply system
111 Electrolyte solution tank
111a Heater
112 Electrolyte solution production equipment assembly
112a First electrolyte solution production equipment
112b Second electrolyte solution production equipment 120 Electrolyzer
130 Hydrogen gas purification system
131 Hydrogen gas filter equipment
132 First molecular filter membrane equipment
140 Hydrogen gas compression and drying system
150 Water supply equipment
160 Hydrogen gas supply equipment
170 Oxygen gas purification system
171 Oxygen gas filter equipment
172 Second molecular filter membrane equipment
210 Case
211 Electrolyte solution inlet
212 Electrolyte solution outlet
213 Hydrogen gas outlet
214 Oxygen gas outlet
215 Water injection equipment
216 Hydrogen gas injection equipment
220 Electrolyte chamber
221 Compartment plate
222 Anode chamber
223 Cathode chamber
230 Electrolyte cell
231 Anode bar
232 Cathode bar
233 Support plate
234 Metal plate
235 Insulation plate
310 First gas filter assembly
311 Outer tube
312 Inner tube
312*a* Hydrogen outlet hole
312*b* Molecular filter membrane layer
313 Raw gas input
314 First hydrogen gas output
315 First oxygen gas output
316 Hydrogen chamber
320 Second gas filter assembly
321 Air filter
322 Second hydrogen gas output
323 Second oxygen gas output
324 Filter pad

What is claimed is:

1. A system for producing hydrogen gas, comprising: an electrolyte solution supply system, an electrolyzer, a hydrogen gas purification system, and a hydrogen gas compression and drying system; wherein:

the electrolyzer connected to the electrolyte solution supply system, comprising a water injection equipment, a hydrogen gas injection equipment, an electrolyte chamber, and an electrolyte cell; wherein:
the electrolyte cell is arranged inside the electrolyte chamber to perform the electrolysis to creates hydrogen gas and oxygen gas;
the electrolyte chamber contains the electrolyte solution; wherein the electrolyte chamber is divided into an anode chamber and a cathode chamber by compartment plates;
the water injection equipment is installed on the side of the cathode chamber, and connected to inside the cathode chamber; wherein the cathode chamber receives water of a preselected pressure by mean of the water injection equipment at the time of the electrolyte cell has just completed performing the electrolysis;
the hydrogen gas injection equipment is installed on the side of the anode chamber, and connected to inside the anode chamber; wherein the anode chamber receives hydrogen gas of a preselected pressure by mean of the hydrogen gas injection equipment;
the hydrogen gas purification system connected to the electrolyzer for receive hydrogen gas and said hydrogen gas is purified by mean of the hydrogen gas purification system to obtain a purity hydrogen gas; wherein:
the hydrogen gas purification system comprising:
a hydrogen gas filter equipment is connected to the hydrogen gas outlet of the electrolyzer; and
a first molecular filter membrane equipment is connected to the hydrogen gas filter equipment; the first molecular filter membrane equipment comprising a first gas filter assembly, and a second gas filter assembly; wherein:
the first gas filter assembly comprising an outer tube, an inner tube, a raw gas input, a first hydrogen gas output, and a first oxygen gas output;
in the between of the outer tube and the inner tube is a hydrogen chamber;
the raw gas input through with inside of the inner tube;
the inner tube has hydrogen outlet holes and has a molecular filter membrane layer wrapped around it;
the second gas filter assembly comprising an air filter, a second hydrogen gas output, and a second oxygen gas output;
inside of the air filter is arranged filter pads; wherein each filter pad has very small air holes for the passage of hydrogen molecules, and is made of carbon;
the second hydrogen gas output is cone shaped, containing a carbon fiber layer inside;
the hydrogen gas compression and drying system connected to the hydrogen gas purification system for receive the purity hydrogen gas and said purity hydrogen gas dried and compressed by mean of the hydrogen gas compression and drying system.

* * * * *